(12) United States Patent
Takata et al.

(10) Patent No.: US 7,375,622 B2
(45) Date of Patent: May 20, 2008

(54) ALARM GENERATION METHOD AND APPARATUS

(75) Inventors: Kazuaki Takata, Iwaki (JP); Daishi Mori, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 266 days.

(21) Appl. No.: 11/269,164

(22) Filed: Nov. 8, 2005

(65) Prior Publication Data

US 2006/0109095 A1    May 25, 2006

(30) Foreign Application Priority Data

Nov. 8, 2004    (JP)    ............................. 2004-323322

(51) Int. Cl.
 *B60Q 1/00*    (2006.01)
(52) U.S. Cl. ...................... 340/436; 340/435; 340/988; 340/990; 340/995.1; 340/995.28; 340/539.1; 340/539.12; 701/301; 701/302
(58) Field of Classification Search ...................... None
See application file for complete search history.

(56) References Cited

U.S. PATENT DOCUMENTS 5,314,037 A    5/1994    Shaw et al.
6,337,637 B1 *    1/2002    Kubota et al. .............. 340/901
2005/0073438 A1 *    4/2005    Rodgers et al. ............. 340/944
2006/0055525 A1 *    3/2006    Kubota et al. .............. 340/461

* cited by examiner

*Primary Examiner*—Julie Bichngoc Lieu
(74) *Attorney, Agent, or Firm*—Brinks Hofer Gilson & Lione

(57) ABSTRACT

An on-vehicle alarm generation method and an on-vehicle alarm generation apparatus for notifying a driver to be aware of safe driving by detecting a passerby or a bicycle moving at a dangerous point and generating an alarm to the driver are provided. In one aspect, the on-vehicle alarm generation method for detecting a passerby and generating an alarm to a driver includes the steps of including a dangerous driving point in map data and detecting the vehicle position; monitoring whether the vehicle approaches the dangerous driving point; transmitting a searching signal when the vehicle approaches the dangerous driving point; monitoring whether, in response to the searching signal, a responsive signal is received from a mobile device carried by the passerby; and generating an alarm to the driver upon receiving the responsive signal.

20 Claims, 7 Drawing Sheets

ALARM GENERATION METHOD AND APPARATUS

BACKGROUND

1. Field of the Invention

The present invention relates to an alarm generation method and apparatus, and in particular, it relates to an alarm generation method and apparatus for generating an alarm to a driver of a vehicle.

2. Description of the Related Art

With a known technology (see Japanese Unexamined Patent Application Publication 11-232411), a searching radio wave is continuously emitted from on-vehicle equipment to a mobile device carried by a pedestrian or a cyclist. Upon receipt of the radio wave, the mobile device carried by the pedestrian or the cyclist increases its output power. Thus, a receiving device included in the on-vehicle equipment searches for the output power and detects the pedestrian or the cyclist. With this technology, a driver is accurately informed of the approach of a passerby on a poorly visible street or at a pedestrian-crossing and is assisted in performing safe driving.

Unfortunately, the foregoing known technology has a problem, for example, that the on-vehicle equipment must continuously emit a searching radio wave to the mobile device carried by the pedestrian or the cyclist, resulting in a needless consumption of electric energy and also, an adverse effect on other electronic devices due to emission of an unnecessary radio wave.

Also, while placing importance on detecting a pedestrian, a bicycle, or the like as accurately as possible, the known technology is incapable of sensing a dangerous situation in which the pedestrian or the bicycle moves out into the roadway in order to avoid an obstacle on a sidewalk and informing a driver of the situation. In other words, when a utility pole or the like is installed on a narrow sidewalk, two or more pedestrians have difficulty in proceeding along the narrow sidewalk side by side, thereby causing the pedestrian or the bicycle to likely move out into the roadway. Hitherto, such a situation could not be sensed so as to notify a driver to pay attention to it.

BRIEF SUMMARY

Accordingly, it is an object of the present invention to provide an alarm generation method and apparatus configured such that a searching radio wave is emitted only at a specified point such as at a poorly visible curve or an intersection without a traffic signal, where a traffic accident between a vehicle and a pedestrian or a bicycle frequently occurs, and when the pedestrian or the bicycle is detected at the point, an alarm is raised to a driver so as to notify him or her to be aware of safe driving, and needless consumption of electric energy and an adverse effect on other electronic devices due to emission of unnecessary radio waves are reduced.

Another object of the present invention is to provide an alarm generation method and apparatus configured such that a situation in which a pedestrian or a bicycle moves out into the roadway is sensed and a driver is notified to pay attention to the situation.

According to the present invention, the above objects are achieved with the following first and second alarm generation methods for detecting a passerby and raising an alarm to a driver.

The first alarm generation method includes the steps of including a dangerous driving point in map data and detecting the vehicle position; monitoring whether the vehicle approaches the dangerous driving point; transmitting a searching signal when the vehicle approaches the dangerous driving point; monitoring whether, in response to the searching signal, a response signal is received from a mobile device carried by the passerby; and generating an alarm to the driver upon receiving the response signal.

The second alarm generation method includes monitoring whether the vehicle approaches a stepping-out passage point; obtaining the number of passersby proceeding along the stepping-out passage point when the vehicle approaches the stepping-out passage point; and generating an alarm of stepping-out passage to the driver when the obtained number is more than a set number. In the meantime, the stepping-out passage point is previously included in map data, and the vehicle position is detected. With this arrangement, the approach of the vehicle to the stepping-out point is detected on the basis of the distance between the stepping-out passage point and the vehicle position.

According to the present invention, the above objects are achieved with the following first and second alarm generation apparatuses for detecting a passerby and generating an alarm to a driver.

The first alarm generation apparatus includes storing means for storing map data including a dangerous driving point; measuring means for detecting the vehicle position; monitoring means for monitoring whether the vehicle position approaches the dangerous point; searching-signal transmitting means for transmitting a searching signal when the vehicle approaches the dangerous driving point; response-signal receiving means for receiving a responsive signal emitted from a mobile device carried by the passerby in response to the searching signal; and alarm generating means for generating an alarm to the driver upon receiving the responsive signal.

The second alarm generation apparatus includes monitoring means for monitoring whether the vehicle approaches a stepping-out passage point; dangerous-point passerby counting means for obtaining the number of passersby proceeding along the stepping-out passage point when the vehicle approaches the stepping-out passage point; and alarm generating means for generating an alarm of stepping-out passage when the number of passersby is more than a set number.

ADVANTAGES OF THE INVENTION

According to the present invention, the on-vehicle alarm generation method includes the steps of including a dangerous driving point in map data and detecting the vehicle position; monitoring whether the vehicle approaches the dangerous driving point; transmitting a searching signal when the vehicle approaches the dangerous driving point; monitoring whether, in response to the searching signal, a responsive signal is received from a mobile device carried by the passerby; and generating an alarm to the driver upon receiving the responsive signal. Hence, a searching radio wave is emitted only at a specified point such as a poorly visible curve or an intersection without a traffic signal that is the location of frequent traffic accidents. A pedestrian or a cyclist at the point is detected, and an alarm is generated to a driver so as to notify him or her to be aware of safe driving. In addition, needless consumption of electric energy and an adverse effect on other electronic devices due to emission of unnecessary radio waves can be reduced.

Also, according to the present invention, the on-vehicle alarm generation method includes the steps of monitoring whether the vehicle approaches a stepping-out passage point; obtaining the number of passersby proceeding along the stepping-out passage point when the vehicle approaches the stepping-out passage point; and generating an alarm of stepping-out passage to the driver when the obtained number is more than a set number. Hence, a situation in which a pedestrian or a bicycle steps or moves out into the roadway is sensed, and a driver is notified to pay attention to the situation.

DETAILED DESCRIPTION OF THE PREFERRED EMBODIMENTS

Figure 1:
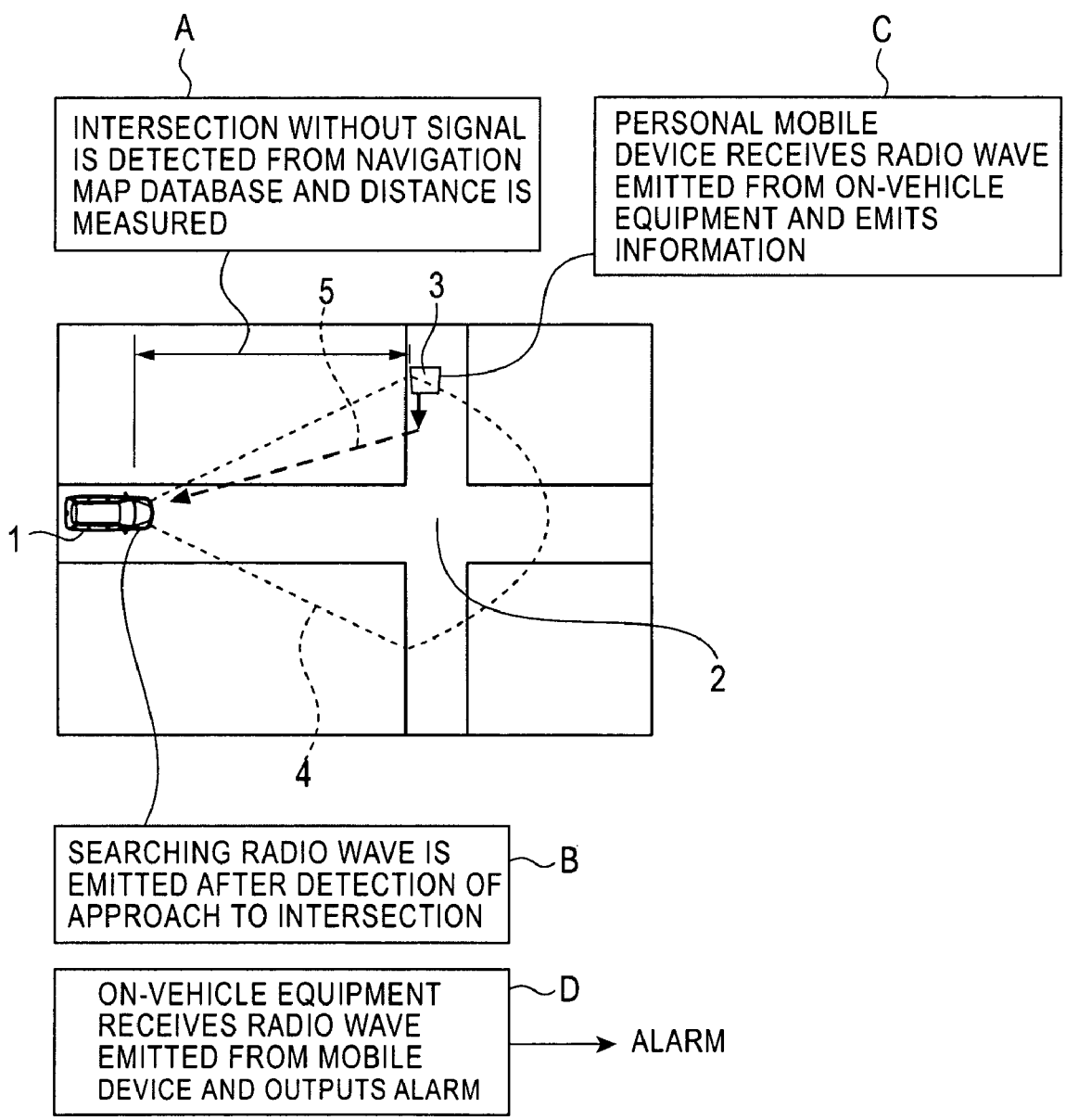
FIG. 1 is a general view illustrating an embodiment of the present invention.

FIG. 1 is a general view illustrating an embodiment of the present invention. An on-vehicle drive-alarm generation apparatus monitors an automobile or other vehicle 1 approaching a previously registered dangerous point 2 such as a poorly visible curve or an intersection without a traffic signal that is the location of frequent traffic accidents. More specifically, the drive-alarm generation apparatus monitors the automobile as described below.

(A) While previously including the dangerous point in navigation map data, the drive-alarm generation apparatus detects the approach of the automobile 1 to the dangerous point 2 by computing the distance between the vehicle position and the dangerous point and by determining whether the distance becomes equal to or less than a set value.

(B) Upon detecting the approach of the automobile 1 to the dangerous point (intersection) 2, the drive-alarm generation apparatus emits a radio wave 4 searching for a pedestrian or a bicycle.

(C) Upon detecting the searching radio wave 4, a mobile device 3 carried by the pedestrian or a bicyclist emits a responsive signal in return.

(D) Upon receiving a responsive radio wave 5 from the mobile device 3, the drive-alarm generation apparatus determines that the pedestrian or the cyclist exists at the dangerous point and generates an alarm.

With this arrangement, a searching radio wave is emitted only at a dangerous point for detecting the pedestrian or the cyclist at the dangerous point, and, upon detection, an alarm is generated to a driver so as to notify him or her to be aware of safe driving. In addition, needless consumption of electric energy and an adverse effect on other electronic devices due to emission of unnecessary radio waves can be reduced.

First Embodiment

Figure 2:
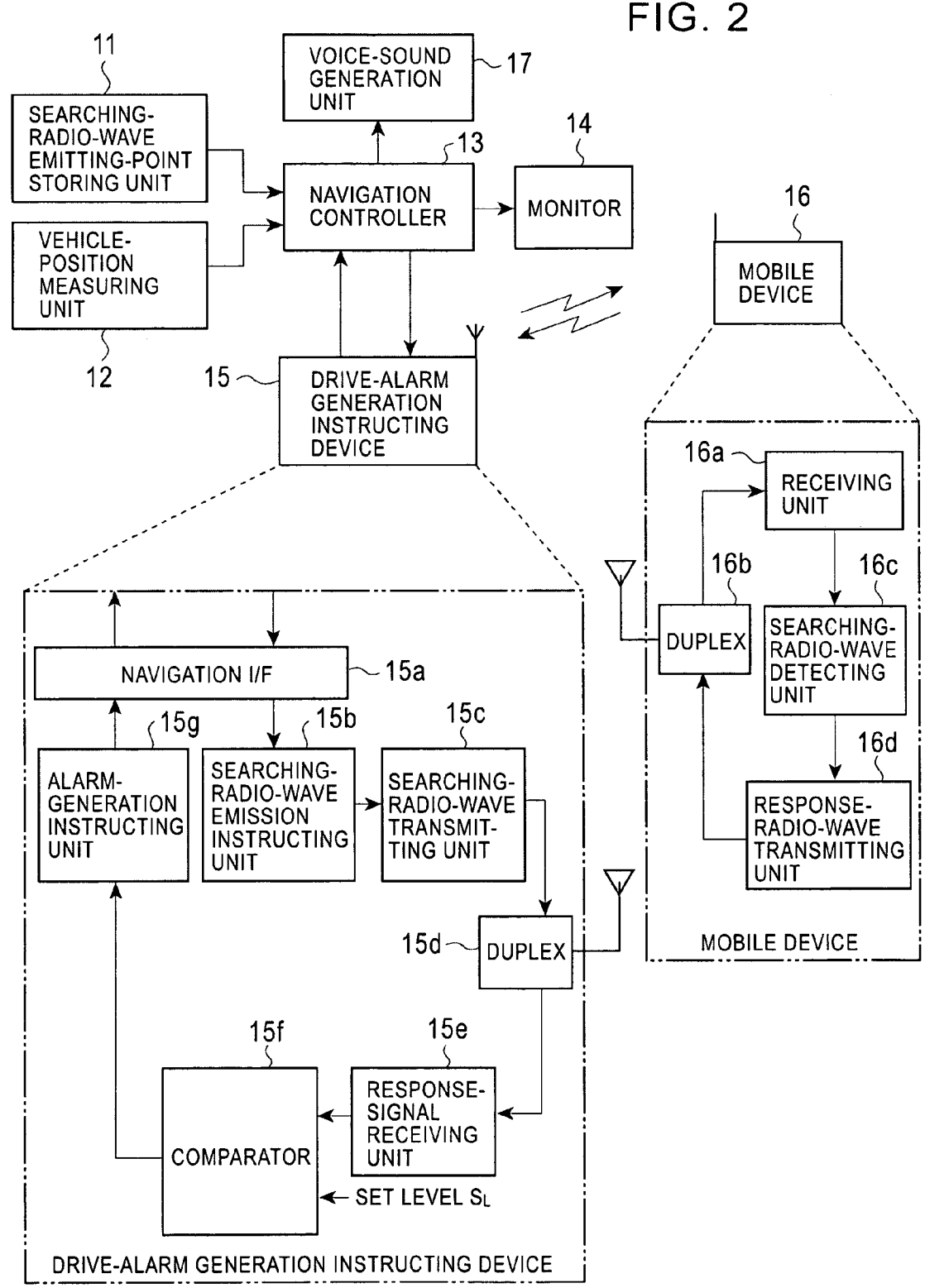
FIG. 2 is a block diagram of the structure of an alarm generation apparatus according to a first embodiment of the present invention.
Figure 3:
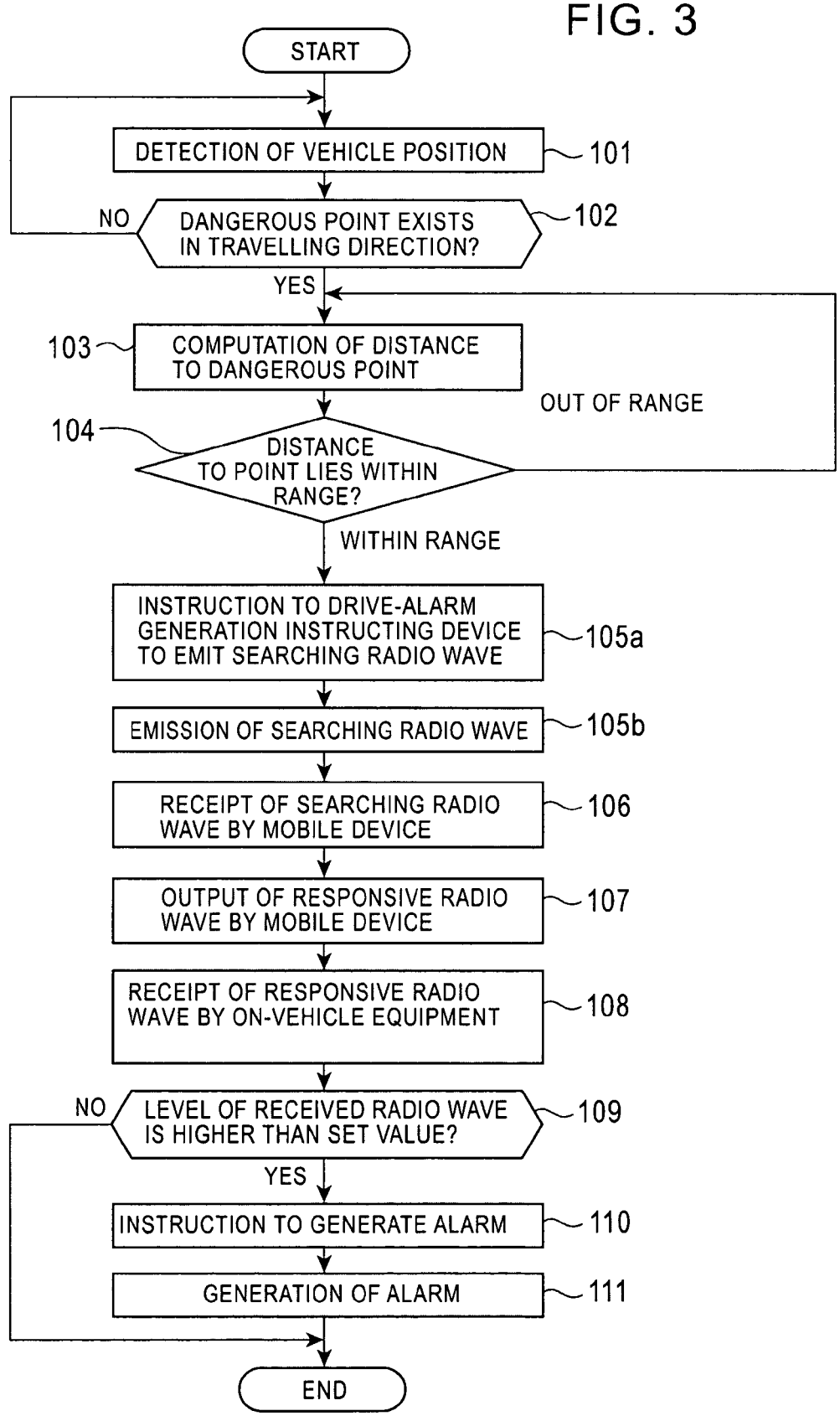
FIG. 3 is a flowchart of an operation of the alarm generation apparatus for generating an alarm.

FIG. 2 is a block diagram of the structure of an alarm generation apparatus according to a first embodiment of the present invention, and FIG. 3 is a flowchart of an operation of the alarm generation apparatus for generating an alarm.

The alarm generation apparatus generally includes a searching-radio-wave emitting-point storing unit 11, a vehicle-position measuring unit 12, a navigation controller 13, a monitor 14, a drive-alarm generation instructing device 15, a mobile device 16, and a voice-sound generation unit 17.

A searching-radio-wave emitting-point, i.e., a dangerous point, is previously registered in the searching-radio-wave emitting-point storing unit 11. In practice, the searching-radio-wave emitting-point is registered in map data stored in a map database used with a navigation system. For example, the dangerous point may be one of the following:

an intersection without a traffic signal
a poorly visible curve (specified on the basis of its curvature of radius)
a point at which traffic accidents frequently occur,
a specified school route,
a bus stop, and
a blind bus garage (when departing from it).

The vehicle-position measuring unit 12 detects the vehicle position and provides it to the navigation controller 13 (step 101). The navigation controller 13 displays a map on the monitor 14 with the aid of map data around the vehicle position and monitors whether a searching-radio-wave emitting point (a dangerous point) exists in the vehicle's traveling direction (step 102). If a searching-radio-wave emitting point exists, the navigation controller 13 computes a distance from the vehicle to the point (step 103), and, when the distance becomes equal to or less than a set distance as the vehicle approaches the searching-radio-wave emitting point (step 104), instructs the drive-alarm generation instructing device 15 to emit a searching radio wave (step 105a).

Upon receiving the instruction to emit a searching radio wave, the drive-alarm generation instructing device 15 emits the searching radio wave towards the dangerous point (step 105b). Upon receiving the searching radio wave (step 106), the mobile device 16 carried by a pedestrian, a cyclist, or the like emits a responsive radio wave to the drive-alarm generation instructing device 15 (step 107). Upon receiving the responsive radio wave from the mobile device 3 (step 108), the drive-alarm generation instructing device 15 compares the level of the received responsive radio wave with a set level $S_L$ (step 109). When the level of the received radio wave is not lower than the set level $S_L$, indicating that a pedestrian or a cyclist exists at the dangerous point, the drive-alarm generation instructing device 15 issue an instruction to generate an alarm (step 110). For example, when the drive-alarm generation instructing device 15 transmits an alarm generation signal to the navigation controller 13, the navigation controller 13 displays a danger mark at the dangerous point, and the voice-sound generation unit 17 raises a sound alarm (step 111).

Instead of being set at a standard value, the set level $S_L$ can be set by a driver, taking into account the driving skill or driving mentality of the driver. Internal Operations of Drive-Alarm Generation Instructing Device and Mobile Device In the drive-alarm generation instructing device 15, upon receiving an instruction for emitting a searching radio wave from the navigation controller 13 through a navigation IF 15a, a searching-radio-wave emission instructing unit 15b instructs a searching-radio-wave transmitting unit 15c to emit the searching radio wave. With this, the searching-radio-wave transmitting unit 15c radiates the searching radio wave from an antenna via a duplex 15d.

In the mobile device 16, upon receiving a signal via a duplex 16b, a receiving unit 16a supplies the received signal to a searching-radio-wave detecting unit 16c. The searching-radio-wave detecting unit 16c determines whether a searching signal is included in the received signal. If included, the searching-radio-wave detecting unit 16c instructs a response-radio-wave transmitting unit 16d to emit a responsive radio wave; otherwise, no instruction is issued. In response to the emission instruction, the response-radio-wave transmitting unit 16d emits a responsive radio wave.

Also, in the drive-alarm generation instructing device 15, a response-signal receiving unit 15e supplies the level of the received responsive signal to a comparator 15f. When the level of the received radio wave is not lower than the set level, indicating that a pedestrian or a cyclist exists at the dangerous point, the comparator 15f instructs an alarm-generation instructing unit 15g to generate an alarm. When the level of the received radio wave is lower than the set value, indicating that neither a pedestrian nor a cyclist exists at the dangerous point, the comparator 15f issues no instruction. In response to the instruction of generating an alarm, the alarm-generation instructing unit 15g transmits an alarm generation signal to the navigation controller 13. With this, the navigation controller 13 displays with emphasis a danger mark at the dangerous point and issues a sound alarm.

As described above, according to the first embodiment, power consumption of the on-vehicle equipment can be reduced. This will be effective in the future when many on-vehicle devices consuming electric energy are mounted in a vehicle, or electric vehicles are commercially used.

This embodiment will be effective for reducing an adverse effect of the emission of unnecessary radio waves in a state in which a large number of communication devices are used daily in the future.

Second Embodiment

Figure 4:
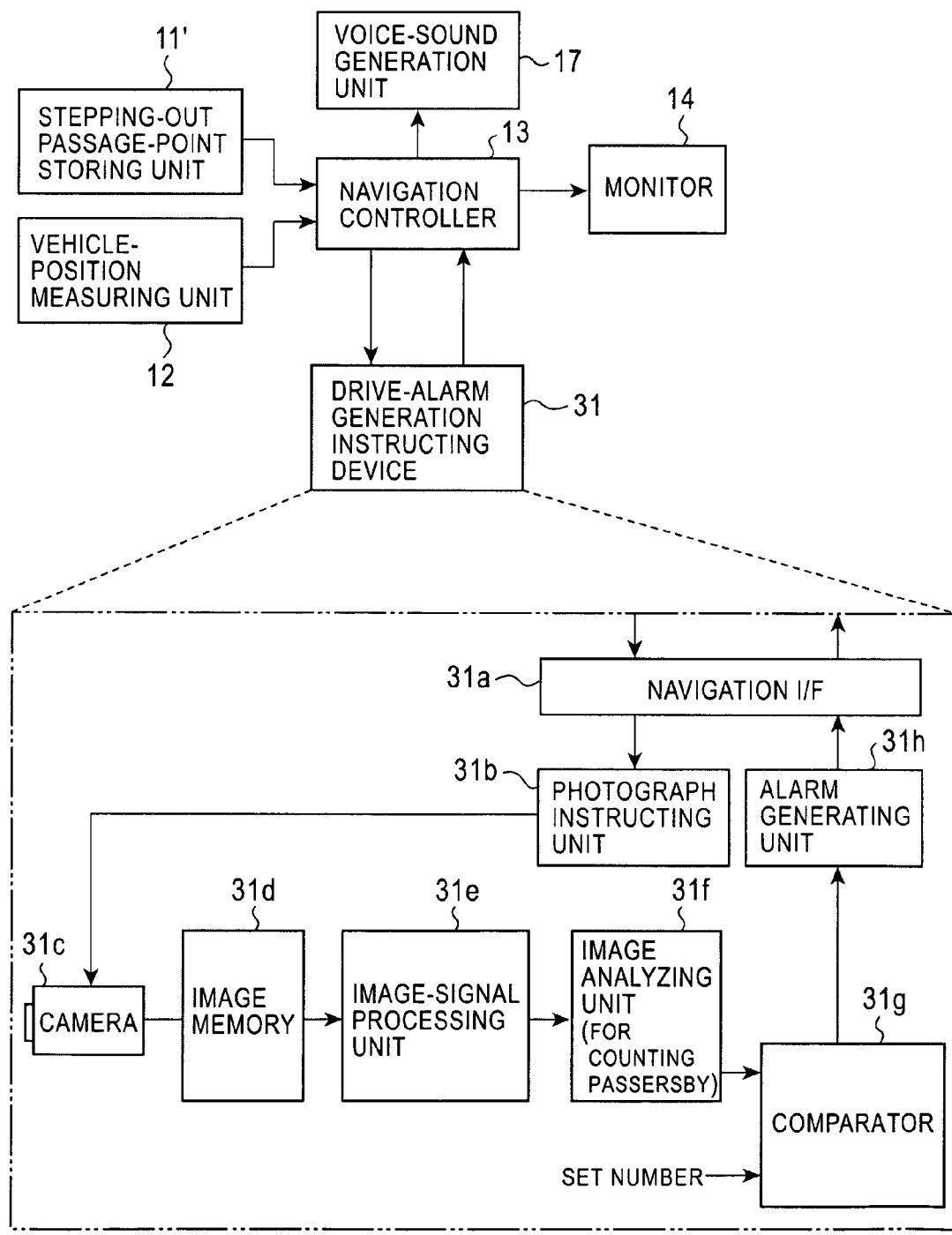
FIG. 4 is a block diagram of the structure of an alarm generation apparatus according to a second embodiment of the present invention.

FIG. 4 is a block diagram of the structure of an alarm generation apparatus according to a second embodiment of the present invention. A stepping-out passage point, i.e., a dangerous point, is previously registered in a stepping-out passage-point storing unit 11'. In practice, the stepping-out passage point is registered in map data stored in a map database used with a navigation system. The vehicle-position measuring unit 12 detects the vehicle position and provides it to the navigation controller 13. The navigation controller 13 displays a map on the monitor 14 with the aid of map data for the area around the vehicle position and monitors whether the stepping-out passage point exists in the vehicle's traveling direction. If the dangerous point exists, the navigation controller 13 computes a distance from the vehicle to the point. When the computed distance matches a set distance and the vehicle approaches the stepping-out passage point, the navigation controller 13 instructs a drive-alarm generation instructing device 31 to start determining whether to generate an alarm.

Figure 5:
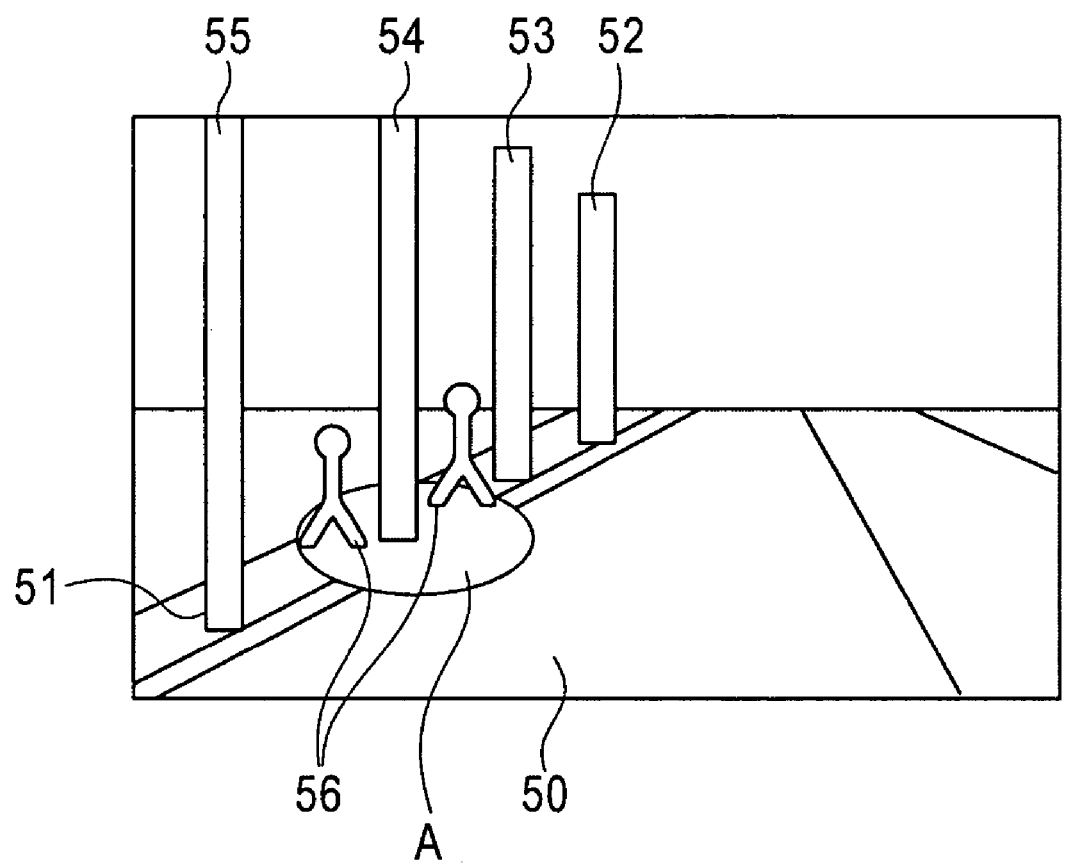
FIG. 5 shows an example picture image at a stepping-out passage point.

Upon receiving a command to start determining whether to generate an alarm, through a navigation I/F 31a, a photograph instructing unit 31b of the drive-alarm generation instructing device 31 instructs a camera 31c to start photographing the stepping-out passage point ahead. With this arrangement, the camera 31c (capable of continuously photographing) starts photographing the stepping-out passage point ahead and stores a photographed image in an image memory 31d. FIG. 5 shows an example photographed picture image at the stepping-out passage point, wherein a roadway 50, a sidewalk 51, obstacles 52 through 55 (such as utility poles and lamp posts) installed along the sidewalk, and pedestrians 56 are diagrammatically illustrated.

An image-signal processing unit 31e applies image-signal processing to the photographed picture image and extracts features of the image. On the basis of the features of the image, an image analyzing unit 31f identifies the number of passersby (including a pedestrian, a bicycle, and a wheelchair) at a stepping-out passage point A, for example by counting their heads. The image-signal processing unit 31e detects a vertically extending narrow object (assumed to be a utility pole or a lamp post) located on the roadside by analyzing the photographed image, and the image analyzing unit 31f regards bodies moving in the vicinity of the lower end of the narrow object as pedestrians and/or bicycles. One aspect of the present invention is that, focusing on a phenomenon that densely gathering pedestrians or bicycles may cause some of them to move out into the road, a driver is notified to pay attention to them under such circumstances. Accordingly, precisely counting the passersby or detecting the position of each of them is not necessary, and merely recognizing the position of an obstacle and the degree of crowding in the vicinity of the obstacle is sufficient.

A comparator 31g compares the number of passersby with a set number and, when the number of passersby is not less than the set number, instructs an alarm generating unit 31h to generate an alarm, on the assumption that some of the passersby are highly likely to step out from the sidewalk into the roadway. After the alarm generating unit 31h transmits an alarm generating signal to the navigation controller 13, the navigation controller 13 displays with emphasis a danger mark at the stepping-out passage point and, at the same time, the voice-sound generation unit 17 produces a voice sound alarm. Instead of the above display, it is possible that a camera-photographed image is displayed on the monitor 14, and the danger mark is displayed with emphasis at the stepping-out passage point of the camera-photographed image.

According to the second embodiment, a situation in which a pedestrian or a bicycle moves out into the roadway is sensed, and a driver is notified to pay attention to the situation.

Modification of the Second Embodiment

With the alarm generation apparatus according to the second embodiment, shown in FIG. 4, by applying image analysis to a camera-photographed picture, the number of passersby along a stepping-out point is identified. Alternatively, by having passersby carry respective mobile devices in the same fashion as in the first embodiment the number of passersby can be directly identified.

Figure 6:
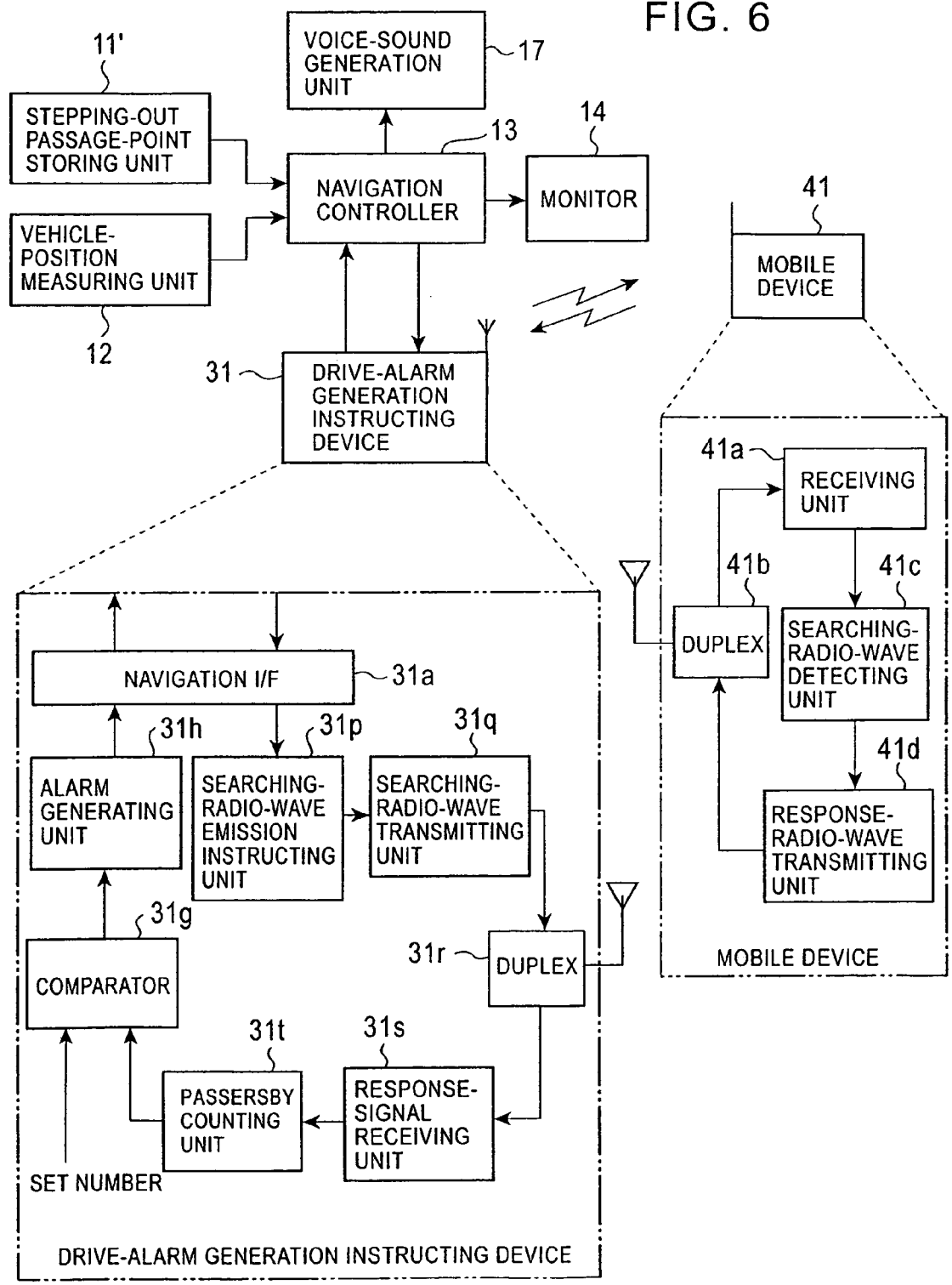
FIG. 6 is a block diagram of the structure of a modification of the alarm generation apparatus according to the second embodiment.

FIG. 6 is a block diagram of the structure of a modification of the alarm generation apparatus according to the second embodiment. In the figure, the same components as those in the alarm generation apparatus according to the second embodiment, shown in FIG. 4, are denoted by the same reference numbers.

In the drive-alarm generation instructing device 31, upon receiving an instruction to emit a searching radio wave from the navigation controller 13 through the navigation IF 31a, a searching-radio-wave emission instructing unit 31p instructs a searching-radio-wave transmitting unit 31q to emit the searching radio wave. With this arrangement, the searching-radio-wave transmitting unit 31q radiates the searching radio wave from an antenna via a duplex 31r.

In a mobile device 41, upon receiving a signal via a duplex 41b, a receiving unit 41a supplies the received signal to a searching-radio-wave detecting unit 41c. The searching-radio-wave detecting unit 41c determines whether a searching signal is included in the received signal. If included, the searching-radio-wave detecting unit 41c instructs a response-radio-wave transmitting unit 41d to emit a responsive radio wave; otherwise, no instruction is issued. In response to the emission instruction, the response-radio-wave transmitting unit 41d emits a responsive radio wave. It is presumed here that the mobile device 41 emits a responsive radio wave having any frequency of N kinds of frequencies.

A response-signal receiving unit 31s converts the received signal into a base-band signal and supplies it to a head counting unit 31t. Of the foregoing N kinds of frequencies, the head counting unit 31t certifies the number of frequencies lying higher than a predetermined signal level as the number of passersby at the stepping-out passage point A. The comparator 31g compares the number of passersby with a set number. When the number of passersby is not less than the set number, the comparator 31g instructs an alarm generating unit 31h to generate an alarm, on the assumption that some of the passersby are highly likely to step out from the sidewalk into the roadway. After the alarm generating unit transmits an alarm generating signal to the navigation controller 13, the navigation controller 13 displays a danger mark at the stepping-out passage point with emphasis, and, at the same time, the voice-sound generation unit 17 produces a voice sound alarm. According to the modification of the second embodiment, in the same fashion as in the second embodiment, a situation in which a pedestrian or a bicycle moves out into the roadway is sensed, and a driver is notified to pay attention to the situation.

Third Embodiment

With the alarm-generation apparatuses according to the second embodiment and its modification, the stepping-out passage point is previously registered in a navigation system, and the approach of the vehicle to the stepping-out passage point is detected. Instead of this arrangement, it is also possible that the approach of the vehicle to the stepping-out passage point is detected by photographing the stepping-out passage point with a camera and by analyzing a camera image.

Figure 7:
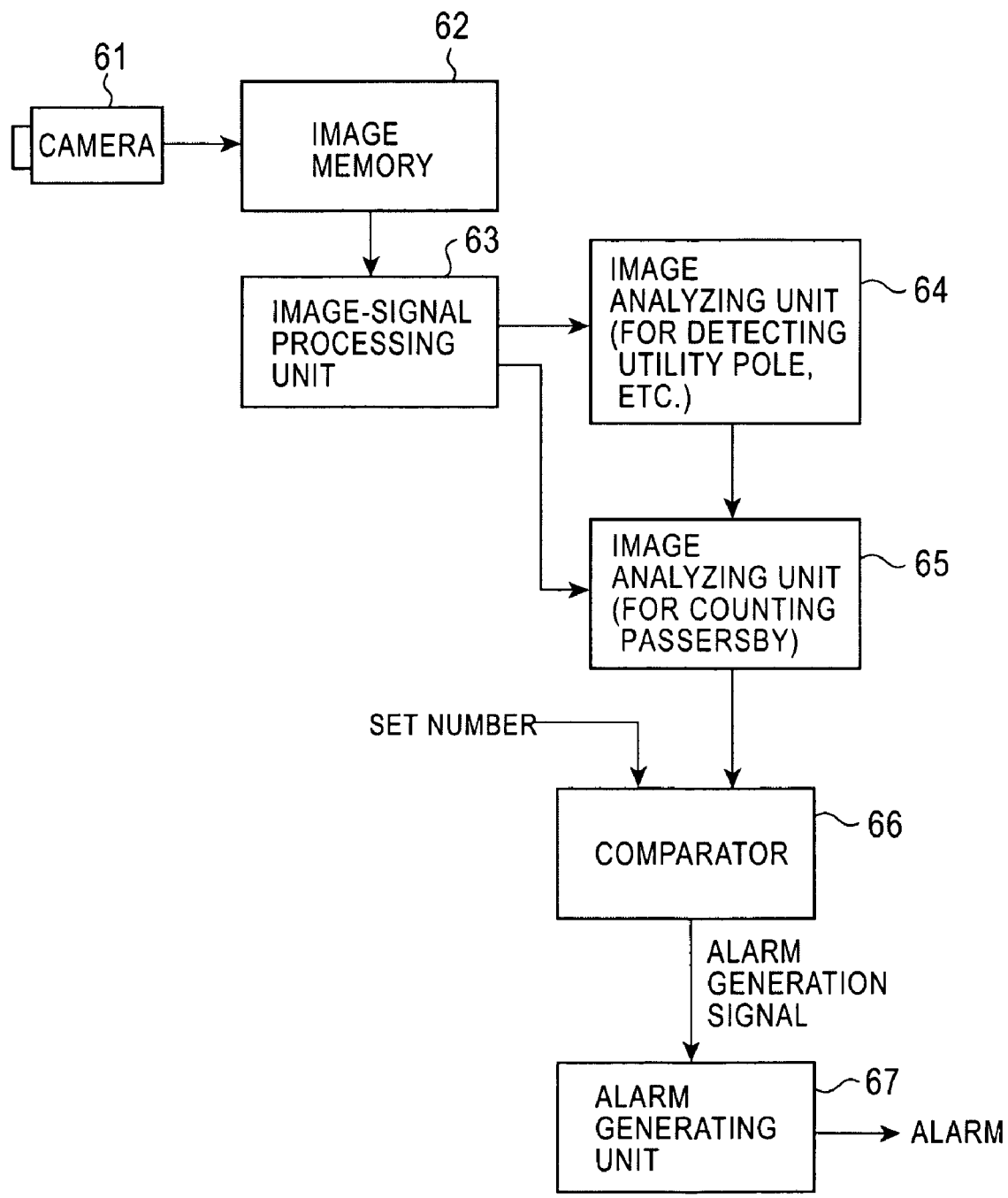
FIG. 7 is a block diagram of the structure of an alarm generation apparatus according to a third embodiment of the present invention.

FIG. 7 is a block diagram of an alarm-generation apparatus having such a structure. A camera 61 capable of continuous photography starts photographing a stepping-out passage point ahead, and the photographed image is stored in an image memory 62. An image-signal processing unit 63 applies image-signal processing to the camera image and extracts features of the image.

On the basis of the features of the image, a first image analyzing unit 64 detects the stepping-out passage point such as a utility pole or a lamp post and notifies a second image analyzing unit 65 of the approach of the vehicle to the stepping-out passage point. When the vehicle approaches the stepping-out passage point, the second image analyzing unit 65 starts counting passersby proceeding along the stepping-out passage point. In other words, the second image analyzing unit 65 counts the number of bodies moving in the vicinity of the lower end of the narrow object (assumed to be a utility pole or a lamp post) by regarding them as pedestrians and/or bicycles.

A comparator 66 compares the number of passersby with a set number. When the number of passersby is not less than the set number, the comparator 66 instructs an alarm generating unit 67 to generate an alarm, on the assumption that some of the passersby are highly likely to move out from the sidewalk into the roadway. In response to this instruction, the alarm generating unit 67 generates an alarm.

As described above, according to the second and third embodiments, a driver is not notified to pay attention to all passersby along the sidewalk but is only notified to pay attention to passersby moving out into the roadway so as to avoid an obstacle installed along the sidewalk. In addition, the alarm generation apparatus may be combined with a night-vision viewer or the like, allowing not only a video of a pedestrian or a bicycle captured by the camera to be displayed but also allowing a location at which a passerby is likely to move out into the roadway to be displayed with emphasis.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. An on-vehicle alarm generation method for detecting a passerby and generating an alarm to a driver, comprising:
   identifying and storing a dangerous driving point in map data;
   detecting the vehicle position;
   monitoring whether the vehicle approaches the dangerous driving point;
   transmitting a searching signal when the vehicle approaches the dangerous driving point, but otherwise not transmitting a searching signal;
   monitoring whether, in response to the searching signal, a responsive signal is received from a mobile device carried by the passerby; and
   generating an alarm to the driver upon receiving the responsive signal.

2. The alarm generation method according to claim 1, wherein the dangerous driving point is one of an intersection without a traffic signal, a curve having a radius of curvature not greater than a predetermined value, a point at which traffic accidents frequently occur, a specified school route, and a bus stop.

3. The alarm generation method according to claim 1, wherein the generated alarm is at least one of a sound alarm and a displayed alarm.

4. The alarm generation method according to claim 3, wherein the displayed alarm is a mark displayed at the dangerous driving point on a displayed map.

5. An on-vehicle alarm generation method for detecting a passerby moving along the sidewalk and for generating an alarm to a driver, comprising:

monitoring whether the vehicle approaches a stepping-out passage point;

obtaining the number of passersby at the stepping-out passage point when the vehicle approaches the stepping-out passage point; and generating an alarm to the driver when the obtained number is more than a set number of passersby.

6. The alarm generation method according to claim 5, further comprising:

including the stepping-out passage point in map data and detecting the vehicle position; and detecting the approach of the vehicle position to the stepping-out passage point on the basis of the distance between the stepping-out passage point and the vehicle position.

7. The alarm generation method according to claim 5, wherein the stepping-out passage point is one of an intersection without a traffic signal, a curve having a radius of curvature not greater than a predetermined value, a point at which traffic accidents frequently occur, a specified school route, and a bus stop.

8. The alarm generation method according to claim 5, wherein the number of passersby is obtained by obtaining an image of the stepping-out passage point, extracting features of the image, and identifying passersby in the image.

9. The alarm generation method according to claim 5, wherein the number of passersby is obtained by transmitting a searching signal when the vehicle approaches the stepping-out passage point and counting the number of responsive signals received from mobile devices carried by the passersby in response to the searching signal.

10. The alarm generation method according to claim 5, wherein the generated alarm is at least one of a sound alarm and a displayed alarm.

11. An on-vehicle alarm generation apparatus for detecting a passerby and generating an alarm to a driver, comprising:

a map-data storing unit holding map data identifying and storing a dangerous driving point;

a vehicle measuring unit detecting a vehicle position;

a navigation controller computing the distance between the vehicle position and the dangerous driving point stored in the map-data storing unit;

a searching-signal transmitting unit transmitting a searching signal when the distance becomes equal to or less than a set distance, but otherwise not transmitting a searching signal;

a response-signal receiving unit receiving a responsive signal emitted from a mobile device carried by the passerby in response to the searching signal; and an alarm generating unit generating an alarm to the driver upon receiving the responsive signal.

12. The alarm generation apparatus according to claim 11, wherein the dangerous driving point is one of an intersection without a traffic signal, a curve having a radius of curvature not greater than a predetermined value, a point at which traffic accidents frequently occur, a specified school route, and a bus stop.

13. The alarm generation apparatus according to claim 11, wherein the generated alarm is at least one of a sound alarm and a displayed alarm.

14. The alarm generation apparatus according to claim 13, wherein the displayed alarm is a mark displayed at the dangerous driving point on a displayed map.

15. An on-vehicle alarm generation apparatus for detecting a passerby moving along the sidewalk and for generating an alarm to a driver, comprising:

a navigation controller monitoring whether the vehicle approaches a stepping-out passage point previously registered in a navigation system;

a passerby counting unit counting passersby near the stepping-out passage point when the vehicle approaches the stepping-out passage point; and an alarm generating unit generating an alarm when the number of passersby is more than a set number.

16. The alarm generation apparatus according to claim 15, wherein the stepping-out passage point is one of an intersection without a traffic signal, included in map data, a curve having a radius of curvature not greater than a predetermined value, a point at which traffic accidents frequently occur, a specified school route, and a bus stop.

17. The alarm generation apparatus according to claim 15, wherein the number of passersby is obtained by obtaining an image of the stepping-out passage point, extracting features of the image, and identifying passerby in the image.

18. The alarm generation apparatus according to claim 15, wherein the number of passersby is obtained by transmitting a searching signal when the vehicle approaches the stepping-out passage point and counting the number of responsive signals received from mobile devices carried by the passersby in response to the searching signal.

19. The alarm generation apparatus according to claim 15, wherein the generated alarm is at least one of a sound alarm and a displayed alarm.

20. The alarm generation apparatus according to claim 19, wherein the displayed alarm is a mark displayed at the stepping-out passage point on a displayed map.

* * * * *